United States Patent Office 2,810,731
Patented Oct. 22, 1957

2,810,731

PHTHALIDYL ALKYL PHENOLS

Joseph F. Shekleton, Lyndhurst, Ohio, assignor to The Goodyear Tire & Rubber Company, Akron, Ohio, a corporation of Ohio No Drawing. Application February 23, 1954,
Serial No. 412,078

9 Claims. (Cl. 260—343.3)

This invention relates to new compositions of matter and is particularly concerned with phthalidyl phenols having substituents on the phenolic rings wherein at least one substituent contains more than one carbon atom.

According to the present invention, new compounds have been prepared which are phthalidyl phenols containing a phenolic ring substituent having more than one carbon atom and which may be prepared by condensing, in the presence of a condensing agent, o-phthalaldehydic acid and substituted phenols in which at least one substituent contains more than one carbon atom.

The new compositions can be structurally defined as

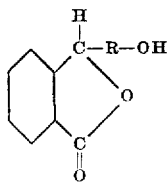

wherein R is an aromatic radical having from 1 to 4 substituents, said substituents being selected from the group consisting of alkyl groups wherein at least one alkyl group has more than one carbon atom, phenyl groups, phenylalkyl groups and cycloalkyl groups. The aromatic radical can be a simple benzene ring or it can be a double ring. It can contain substitution in any position not substituted with the phthalidyl radical or the hydroxyl radical. In the preferred compositions, R represents a benzene ring containing a secondary or tetiary alkyl group, preferably in the position ortho or para to the hydroxyl.

These condensation products can in some cases be isolated as pure materials or they may be left in a crude state. The crude condensation reaction mixture can be purified by washing with water and then drying the same. The crude products of the invention are customarily mushy, lumpy, semifluid, colorless masses, these characteristics being controlled somewhat by selection of the phenolic reactant. Both the unpurified and purified materials are useful as nonstaining antioxidants for rubber and rubber-like materials. In the customary practice of the invention, isolation and purification are not generally necessary. As a class, the antioxidants of this invention are nonstaining antioxidants, i. e., they do not migrate to the surface of a rubber product and oxidize to cause discoloration.

The new compounds of this invention can be described as substituted phthalidyl phenols having at least one substituent with more than one carbon atom, the phthalidyl alkyl phenols or phthalidyl phenyl phenols representing preferred classes of materials because they are more economically prepared and because they contain no unsaturation which might cause undesirable side reactions. For example, substituted phthalidyl alkyl phenol wherein the alkylation contains more than one carbon and the phthalidyl alkyl cresols wherein the alkylation contains more than one carbon give good antioxidant properties, phthalidyl alkyl para cresol wherein the alkylation contains more than one carbon being preferred. Generally, the phenolic alkylation will contain at least two carbon atoms and not over 10 carbon atoms.

The phenolic radical may be provided by any aromatic hydroxy compound. The phenolic radical may be dihydroxy or polyhydroxy, although it is preferable that it be monohydroxy and that the hydroxyl radical be located ortho or para to the phthalidyl radical. The phenolic radical can contain a nucleus having more than one benzene ring. For example, the naphthols are useful in the practice of this invention, although a phenolic compound having a single benzene nucleus is preferred. The benzene nucleus can contain ring substituents in any position not occupied by a hydroxyl group, although it is desirable to have a position ortho or para to the hydroxyl of the phenolic reactant available because it provides for better reaction conditions. For example, the benzene nucleus can contain substituents such as alkyl groups having more than one carbon, phenyl groups, phenylalkyl groups, and/or cycloalkyl groups. In order to provide greater antioxidant activity, it is preferred that the substituent be an alkyl group and that the alkyl group be a secondary or tertiary alkyl group.

In the practice of the invention, phthalidyl phenols having desired characteristics can be obtained by reacting ortho phthalaldehydic acid with a selected alkylated phenol. In this manner antioxidant properties can be controlled.

Representative examples of the compositions of this invention are:

Phthalidyl α-phenylethyl-p-cresol
Phthalidyl p-tertiary-butyl-p-cresol
Phthalidyl p-tertiary-butyl-o-cresol
Phthalidyl o-tertiary-butyl-o-cresol
Phthalidyl mono-tertiary-butyl-o-isopropyl phenol
Phthalidyl p-isooctyl phenol
Phthalidyl 4,6-di-tertiary-butyl-m-cresol
Phthalidyl p-tertiary-butyl phenol
Phthalidyl o-tertiary-butyl phenol
Phthalidyl o-tertiary-butyl-p-cresol
Phthalidyl p-isooctyl-o-cresol
Phthalidyl 2,4-di-tertiary-butyl phenol The preparation of the compounds of the invention is illustrated by the following examples:

EXAMPLE 1

Ortho-phthalidyl-mono-tertiary-butyl-o-isopropyl phenol was prepared in the following manner:

Thirty-eight and four-tenth grams of mono-tertiary-butyl-ortho-isopropyl phenol and 200 grams of 95% sulfuric acid were cooled in an ice bath. To the cooled mixture 30 grams of o-phthalaldehydic acid were added. This reaction mixture was allowed to stand for 6 hours with occasional stirring and then the temperature of the mixture was allowed to rise slowly to room temperature during a period of 16 hours. Thereafter, the mixture was diluted with 500 milliliters of water in order to dilute the sulfuric acid which was thereupon decanted from the heterogeneous agglomerate. The residue, which was the indicated product, was washed again and then dried over anhydrous calcium chloride until there was no observable loss of weight.

EXAMPLE 2

Phthalidyl-para-tertiary-butyl-ortho-cresol was prepared by condensing ortho-phthalaldehydic acid and para-tertiary-butyl-ortho-cresol. Fifteen grams of ortho-phthalaldehydic acid, 16.5 grams of para-tertiary-butyl-ortho-cresol and 100 grams of concentrated sulfuric acid were mixed at room temperature and allowed to stand for about 18 hours. During this time the mixture was stirred periodically. The mixture was then diluted with 250 cc. of water, cooled to room temperature and filtered. The resultant white solid was warmed with 100 grams of 5% sodium hydroxide and allowed to stand over a week-end. The mixture was then filtered and the white solid was again washed with 100 cc. of water and then dried over calcium chloride to provide the indicated composition.

EXAMPLE 3

Phthalidyl-ortho-tertiary-butyl-ortho-cresol was prepared by mixing together 15.0 grams of ortho-phthalaldehydic acid, 16.4 grams of ortho-tertiary-butyl-ortho-cresol and 100 grams of concentrated sulfuric acid. This mixture was allowed to stand at room temperature, with occasional stirring for a period of 70 hours. The mixture was then washed four times with 250 cc. portions of water and finally filtered and dried over anhydrous calcium chloride, thus providing a sticky, glassy material which was the indicated product.

EXAMPLE 4

Phthalidyl-mono-α-phenylethyl-p-cresol was prepared as follows:

Thirty grams of phthalaldehydic acid were dissolved in 42.4 grams of mono-o-α-phenylethyl-p-cresol while warming the mixture. This composition was then chilled in an ice bath. Thereafter 65 grams of ice cold $H_2SO_4$ were stirred into the mixture. Intermittent stirring and shaking were continued for three hours after which the mixture was packed in ice for a period of about 15 hours. Then the reaction mixture was warmed to room temperature, stirred, and again cooled in an ice bath. After a period of 45 hours, the sulfuric acid was diluted and decanted and the resultant product washed three times in hot ethyl alcohol, thus providing the indicated compound.

EXAMPLE 5

Ortho-phthalidyl-mono-octyl-p-cresol was prepared by adding 30 grams of phthalaldehydic acid to 44 grams of mono-octyl-p-cresol. The mixture was warmed in order to effect solution and then cooled. Thereafter, it was treated with 81 grams of concentrated (73%) sulfuric acid. This mixture was shaken in a mechanical shaker for 30 minutes after which the product was diluted with water, filtered and washed. The resultant semisolid residue was twice washed with 300 cc. of hot ethyl alcohol and then dried. Analysis shows that a substantial amount of the indicated material was present.

Various other phenolic compositions can be reacted with-o-phthalaldehydic acid to provide the useful phthalidyl phenols. The proportion of reactants will customarily be approximately equimolecular. The temperature maintained during the reaction can vary over a substantial range and is not critical, although best results are obtained by keeping the temperature below normal room temperature.

Any customary condensation method can be used to produce the useful products of the invention. For example, any of the common condensing agents can be used to activate the reaction and split off water. Because of the nature of the condensation reaction, it is customary to use a large excess of the condensing agent which can be recovered for reuse. Sulfuric acid, chlorosulfonic acid, phosphorus pentoxide, boron trifluoride and aluminum chloride are examples of suitable condensing agents, sulfuric acid being preferred in the practice of this invention.

The products of this invention have been subjected to tests in order to show their superior qualities as antioxidants. The age resisting qualities have been ascertained by measuring the retention of tensile strength and the increase in weight after treatment with oxygen. The antioxidants were incorporated into the following standard rubber formulation for testing:

| | |
|---|---|
| Natural rubber | 100.00 |
| Zinc oxide | 5.00 |
| Sulfur | 3.00 |
| Stearic acid | 1.50 |
| Antioxidant | 1.00 |

The following table indicates the results obtained when cured rubber samples containing the indicated products of the invention were tested in an oxygen bomb:

Table I

[Cure—50 minutes at 285° F.]

| | Sample No. | | | | |
|---|---|---|---|---|---|
| | 1 | 2 | 3 | 4 | 5 |
| Unaged Data: | | | | | |
| Original tensile | 2,000 | 1,700 | 1,550 | 1,400 | 1,400 |
| Original elongation | | 830 | 840 | 800 | 810 |
| Aged under pressure at 50° C. 6 days in an $O_2$ bomb: | | | | | |
| Percent tensile retention | 0 | 80.9 | 114.5 | 107.1 | 125.0 |
| Percent weight gain | 15.3 | 0.38 | 0.02 | 0.06 | 0.06 |
| Aged under pressure at 50° C. for 12 days in an $O_2$ bomb: | | | | | |
| Percent tensile retention | 0 | 79.4 | 103.2 | 119.6 | 116.1 |
| Percent weight gain | 16.8 | 0.65 | 0.035 | 0.133 | 0.08 |
| Aged under pressure at 50° C. for 18 days in an $O_2$ bomb: | | | | | |
| Percent tensile retention | 0 | 58.8 | 90.3 | 110.7 | 108.9 |
| Percent weight gain | 15.7 | 0.61 | 0.14 | 0.22 | 0.13 |

Sample #1 contained no antioxidant.
Sample #2 contained a commercial nonstaining antioxidant which is a mixture of alkylated phenols.
Sample #3 contained, as an antioxidant, 2 [(3) phthalidyl] 6-tertiary-butyl-para-cresol.
Sample #4 contained, as an antioxidant, 4 [(3) phthalidyl] 6-tertiary-butyl-o-cresol.
Sample #5 contained, as an antioxidant, (3) phthalidyl, mono-tertiary-butyl-o-isopropyl phenol.

Further tests were conducted on the preferred materials to establish that the products of the invention are nonstaining and nondiscoloring. Representative products of the invention were compounded in a white rubber formula containing natural rubber, sulfur, zinc oxide, calcium carbonate, stearic acid and antioxidant in the relationship of one part antioxidant to 100 parts natural rubber. These samples, plus one sample containing a commercial nonstaining antioxidant and one sample containing no antioxidant, were exposed in a weatherometer for 48 hours. The following table summarizes the results:

Table II

| Antioxidant | Rating |
|---|---|
| Control—no antioxidant | no stain. |
| Antioxidant A [1] | slight stain. |
| 2 [(3) phthalidyl] 6-tertiary-butyl-p-cresol | Do. |
| 4 [(3) phthalidyl] 6-tertiary-butyl-o-cresol | Do. |
| (3) phthalidyl mono-tertiary-butyl-o-isopropyl phenol | Do. |

[1] A commercial nonstaining antioxidant comprising a mixture of alkylated phenols.

The term "a rubber" is used herein to include natural rubber and the various synthetic rubbers which are similar to rubber in their aging characteristics, such as polychloroprene, butyl rubber which is a polymerization product of a major proportion of mono-olefin, such as isobutylene, and a minor proportion of a multi-olefin, such as butadiene or isoprene; the rubbery copolymers of butadiene and styrene; the rubbery copolymers of butadiene and acrylonitrile; chlorinated rubbers; and rubber hydrochloride.

The products of the invention are useful as age resisters for raw rubber in latex form, coagulated rubber latices, or vulcanized rubbers and may be present in an amount of from .25 to 5% by weight based on the weight of the rubber, although it is preferred to use from .5 to 2% by weight, based on the weight of the rubber.

While certain representative embodiments and details have been shown for the purpose of illustrating the invention, it will be apparent to those skilled in this art that various changes and modifications may be made therein without departing from the spirit or scope of the invention.

I claim:

1. As new composition of matter, compounds having the structural formula:

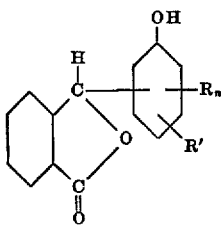

wherein R is an alkyl radical, R' is an alkyl radical containing 4 to 10 carbon atoms and n is a whole number from 0 to 3, the total number of carbon atoms in all the alkyl substituents on the hydroxyphenyl group being from 5 to 10.

2. Phthalidyl alkyl phenols according to claim 1 wherein said substituent R' is linked to the hydroxyphenyl group through a tertiary carbon atom.

3. Phthalidyl alkyl phenols according to claim 2 wherein said substituent R' is linked to the hydroxyphenyl group through a secondary carbon atom.

4. Phthalidyl alkyl phenols according to claim 1 wherein n is one, said substituent R' is linked to the hydroxyphenyl group through a tertiary carbon atom and the positions meta to the hydroxy substituent of the hydroxyphenyl group are unsubstituted.

5. As a new composition of matter, 4 [(3) phthalidyl] 6-tertiary-butyl-o-isopropyl phenyl.

6. As a new composition of matter, 2[(3) phthalidyl] 6-mono-octyl-p-cresol.

7. As a new composition of matter, 6[(3) phthalidyl] 2,4-di-tertiary-butyl phenol.

8. As a new composition of matter, 2[(3) phthalidyl] 6-tertiary-butyl-para-cresol.

9. As a new composition of matter, 4[(3) phthalidyl] 6-tertiary-butyl-o-cresol.

References Cited in the file of this patent

UNITED STATES PATENTS 2,088,633  Bousquet et al. ———————— Aug. 3, 1937
2,150,595  Austin et al. ———————————— Mar. 14, 1939

OTHER REFERENCES

Bistrzycki et al.: (I), Berichte 27, pp. 2632–2640 (1894).

Bistrzycki et al.: (II), Helv. Chim. Acta 3, p. 371 (1920).

Beilstein, vol. XVIII, p. 72 (1934).

Whitmore, Organic Chemistry, 2nd ed., 1951, D. Van Nostrand Co., Inc., New York.

UNITED STATES PATENT OFFICE

CERTIFICATE OF CORRECTION

Patent No. 2,810,731                                 October 22, 1957

Joseph F. Shekleton

It is hereby certified that error appears in the printed specification of the above numbered patent requiring correction and that the said Letters Patent should read as corrected below.

Column 1, line 44, for "tetiary" read --tertiary--; column 6, line 7, for "phenyl" read --phenol--.

Signed and sealed this 11th day of February 1958.

(SEAL)
Attest:
KARL H. AXLINE
Attesting Officer

ROBERT C. WATSON
Commissioner of Patents